United States Patent [19]

Lowrance

[11] 3,835,447
[45] Sept. 10, 1974

[54] LIGHT EMITTING DIODE READOUT
[75] Inventor: Darrell J. Lowrance, Tulsa, Okla.
[73] Assignee: Lowrance Electronics, Inc., Tulsa, Okla.
[22] Filed: Mar. 19, 1973
[21] Appl. No.: 342,378

[52] U.S. Cl. ................................. 340/3 R, 340/3 C
[51] Int. Cl. ............................................ G01s 9/68
[58] Field of Search............ 340/1 C, 1 R, 3 C, 3 F, 340/3 R; 343/13 R

[56] References Cited
UNITED STATES PATENTS

| | | | |
|---|---|---|---|
| 3,125,754 | 3/1964 | Reumerman et al. .............. | 343/13 R |
| 3,588,795 | 6/1971 | Linardos et al. ..................... | 340/3 R |
| 3,750,095 | 7/1973 | Olesen ................................ | 340/3 C |

*Primary Examiner*—Richard A. Farley
*Attorney, Agent, or Firm*—Head & Johnson

[57] ABSTRACT

This disclosure describes a readout or output display for a sonar system which uses a plurality of low power, voltage-sensitive lights, such as light emitting diodes, arranged in sequential order along a line or other geometrical arrangement. A first oscillator controls the pulsing of the underwater ultrasonic transducer means. Each pulse of the first source of pulses also starts a counter, which is controlled by a clock, providing third pulses, which are of a period small compared to the period of the first pulses. On the count of 100 the counter resets to zero. The transducer means receives a reflection of the pulse of ultrasonic energy and converts it to electrical signals. These signals are processed and shaped to form a series of second pulses which mark the times of reception of the reflected pulses. A plurality of gate means are connected to said plurality of lights. Each of the gates are controlled by said second pulses and the pulse outputs of the counter, in such a manner that each of the gates sequentially has a voltage pulse applied from the counter and the particular gate which has such voltage applied to its input, at the same time that the reflection pulse is received, will be lighted. The position of this light will then be a measure of the time interval between the outgoing ultrasonic pulse and the reflected pulse, and therefore a measure of the depth of the reflecting medium.

8 Claims, 1 Drawing Figure

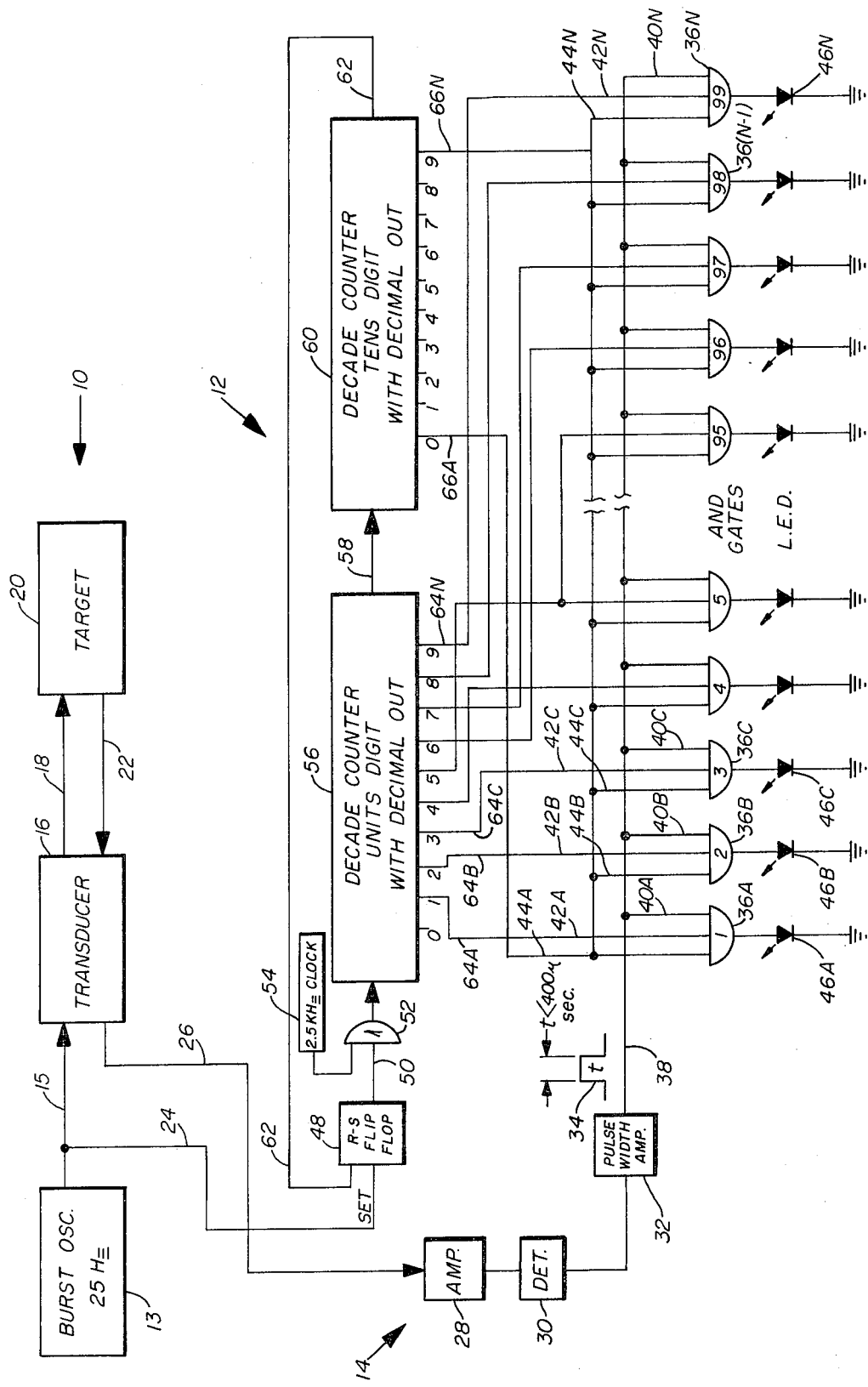

3,835,447

LIGHT EMITTING DIODE READOUT

CROSS REFERENCE TO RELATED APPLICATION

This application is related to the copending application Ser. No. 173,479, now U.S. Pat. No. 3,747,053 inventor is Garland R. Austin, and the application was filed Aug. 20, 1971, entitled: NOISE REJECTION CIRCUIT. It is assigned to the same assignee as this application.

BACKGROUND OF THE INVENTION

It is a principal object of this invention to provide a display or readout for a sonar device which is completely static.

It is a further object of this invention to provide a readout or display of a sonar device which indicates by the energization of a particular lighting unit, in a series of such lighting units, the time of travel of the ultrasonic pulse and the reflection or correspondingly the distance from the ultrasonic source to the reflector in a water medium.

In the prior art devices the initiation of the first pulse that starts the transmission of an ultrasonic pulse through the water is generated by a rotating device which includes a flash lamp, and means for generating a sharp electrical starting pulse. At each revolution of the rotating element when the flash lamp comes to a starting point, or zero point, the starting pulse is generated. This is amplified and converted to an ultrasonic electrical pulse which is amplified and applied to a transducer which generates the ultrasonic pulse in a water medium. When this outgoing ultrasonic pulse reaches a reflector, part of the energy is reflected back to the transducer and a corresponding radio-frequency pulse is generated, amplified, detected and converted to a short duration square pulse.

The display system involves this rotating disc carrying the flash lamp. By means of a brush connection to the rotating shaft, the output of the received pulse amplifier serves to momentarily light the flash lamp. By observing the position of the lighted flash lamp, in degrees of angle from the starting point, the time of travel of the ultrasonic wave, or correspondingly the distance to the reflector can be determined. These rotating systems require a constant speed motor drive and are subject to failure of bearings or friction in the bearings and similar difficulties, particularly in small, low power systems that are designed for use as fish locators and corresponding service units. These systems cannot support an extensive, expensively designed display system. The system of this invention is designed to fill that need.

SUMMARY OF THE INVENTION

The preceding objects are attained and the weaknesses of the prior art devices are overcome in this invention in which the rotating light indicator which is normally used in the prior art devices is replaced by a series of fixed light emitting diodes. These can be arranged in a linear or circular arrangement, etc. At the time of the outgoing ultrasonic pulse an electronic counter is started which is taking signals from a clock oscillator, and counts periods of this oscillator. Each period is designed to have a time duration sufficient for the travel through a selected distance of the ultrasonic pulse in the water. This two feet distance may, for example, be such that each pulse can correspond to a two way distance representing a depth of 1 foot.

When the return pulse is received and processed it is used to control a plurality of gates connected to the outputs of the counter. Light units are connected one to each of the outputs of the gates so that when the return ultrasonic pulse is received that gate which is at the moment connected to a specific terminal of the counter corresponding to that time duration, will have voltage on its input, and will be enabled, by the return ultrasonic pulse signal so as to light the corresponding light unit attached to that gate. Thus, whichever one of the separate light units is lighted can indicate by its geometric position the travel time or depth to the reflector.

In the processing of the return signal pulse it is formed into a square wave of time duration which is slightly less than the period between the clock pulses so that the gate is thereby enabled for that time duration and the light unit connected to the output of the gate will remain lighted for that time duration. Although the duration of the lighted unit is much shorter than the time between successive ultrasonic pulses if the travel time of the pulse remains constant, there will be sequential lighting on the same light unit. Due to the persistence of vision the eye will be able to see this flashing as a continuous light, and can therefore determine the depth to the reflecting medium.

BRIEF DESCRIPTION OF THE DRAWING

These and other objects of this invention and a better understanding of the principles and details of the invention will be evident from the following description taken in conjunction with the appended drawing, which represents schematically in the upper portion the ultrasonic transducer and target and in the lower portion the reflected pulse processing system, and the display system.

DESCRIPTION OF THE PREFERRED EMBODIMENT

In the drawing numeral 10 indicates generally the ultrasonic portion of the system. Numeral 14 indicates generally the received pulse of the reflected ultrasonic pulse signal processing system and numeral 12 represents generally the display system. The portion represented by numeral 10 indicates schematically the basic elements of an ultrasonic sonar system. It includes a burst oscillator 13, which will also be called a first source of first timed pulses, which supplies an electrical signal by line 15 to an ultrasonic transducer 16 which responsive to the burst signal transmits an ultrasonic pulse through the water, indicated by transmission line 18, to a target which is capable of reflecting and returning part of this ultrasonic energy back to the transducer. This target may be a rigid metal surface or similar object or obstacle in the path of the ultrasonic pulse or it may be a group of fish in the water which provide a surface area sufficient to transmit a reflected pulse that will be detectable by the transducer 16. This reflected energy is indicated as going back to the transducer by means of path 22.

The transducer 16 in response to the reflected pulse, creates an electrical signal output which goes by line 26 to the signal processing units which include basically amplifying means 28, detecting means 30, and pulse width amplifier 32. The pulse output of the pulse width amplifier 32 is indicated by numeral 34 as a square wave of voltage which passes by lead 38 to the display system. This square wave has a typical duration of less than 400 microseconds. The signal 34 which is responsive to the reflected ultrasonic signal will be called a second pulse and will carry the time of the reception of the ultrasonic reflections by path 22.

The first pulse generates the ultrasonic signal and is timed with the transmission of the ultrasonic pulse. The second pulse is responsive to the received reflected ultrasonic pulse and is timed with that reception. The difference in time between these two pulses therefore represents the travel time of the ultrasonic pulse in the water, and is therefore a measure of the distance between the transducer and the target.

Referring to the display system indicated generally by numeral 12 there is an input by way of lead 24 from the source of first pulses, namely the first oscillator 13. This will have generally a repetition rate of approximately 25 Hz. This signal of period of 40 milliseconds, will generally be greater than the time of travel of the ultrasonic pulse corresponding to the maximum distance or depth from which it is expected to receive reflection.

There is a clock oscillator 54 which has a frequency approximately 100 times that of the burst oscillator 13. This will be called a third source of timed pulses and will mark intervals of time corresponding to the travel of the ultrasonic signal a typical distance of 2 feet in total travel, and therefore will represent a change in depth of 1 foot.

The first pulses arrive by line 24 and sets a flip-flop 48 which applies a positive voltage on line 50 which goes to one input of the AND gate 52. The other input of the AND gate comes from the clock 54. Therefore, as soon as the first pulse arrives the flip-flop is set and provides a continuing positive voltage on one input of the gate 52. Thereafter, as the clock pulses occur, third pulses are sent to the decade counter 56 which counts from one to 10. The tenth pulse goes by lead 58 to a second decade counter 60 which represents the tens digit. Therefore, on the first count, terminal 1 of the units counter 56 carries a pulse. The next pulse appears on terminal 2, the next on terminal 3 and so forth until terminal 9. The following pulse resets the units counter 56 and at the same time sets the pulse on line 58 and the decade counter 60 then starts counting with a voltage on the zero terminal and every time the unit digit counter 56 completes its ten pulses, voltage shifts on the tens digit counter from zero and then to 1, 2, 3, etc. to 9. The largest count possible by the two decade counters together is 99 and an additional count will then put voltage on lead 62 on the output of the tens digit counter which is connected to the input of the flip-flop 48 and causes it to reset. Therefore the voltage disappears from line 50, the AND gate is blocked and the counting stops.

There are a plurality of light units indicated generally by the numerals 46A, 46B, 46C . . . 46N. These can be any type of light unit desired such as light emitting diodes (L.E.D.), neon lamps, incadescent lamps, liquid crystal devices, etc. However, because of their low current drain the light emitting diodes are to be preferred for this application. Each of the light units is arranged in a geometrical pattern such that it will be convenient to the operator to observe which of the L.E.D. is lighted, and therefore determining from that the number of clock counts which have intervened between the outgoing first pulse and the received second pulse and therefore the distance in feet to the target.

The L.E.D. are powered through AND gate means indicated by numeral 36A, 36B, 36C . . . 36N. Corresponding to the two decade counters there will be 99 of the L.E.D. units and correspondingly 99 of the gate units which are shown by numbers 1, 2, 3, 4, 5–95, 96, 97, 98, 99. Each of these gate units has three inputs, one of the inputs 40A, 40B, 40C . . . 40N are connected together to the output 38 of the pulse width amplifier 32. Therefore they are enabled whenever the returned second pulse is received. There are shown to be two other input leads 42 and 44, one of which is connected to one terminal of the units digit counter and the other to one of the terminals of the tens decade counter. A combination of voltages on the two leads 42, 44 will select one of the 99 gates to be enabled by the pulse 34 and to light the corresponding L.E.D. 46.

Reviewing generally the operation, each burst of the oscillator 13 provides a first pulse which controls the time of transmission of the ultrasonic pulse from the transducer to the target. When the return reflected energy from the target reaches the transducer a second pulse is received, converted to electrical signal and sent to the processing units 14 to provide the pulse 34 which is the second pulse. The first pulse in addition to triggering the transducer also sets a flip-flop 48 which in conjunction with a clock 54 operates the units and tens digits counters 56 and 60 which when the total count is 99, sends a signal to reset the flip-flop and stop counting, until the next burst of the oscillator 13 resets the flip-flop and starts the counting. The two decade counters in total have 20 terminals and each of the group of gates 36 have one input connected to one terminal of each of the counters, the third terminal being connected to the second pulse 34 so that selectively, one of the 99 pulses will be enabled and the corresponding L.E.D. 46 will be lighted corresponding to the time delay between the first and second pulses, in terms of units measured by the clock 54. The particular L.E.D. that is lighted will be an indication or display of the depth or distance between the transducer 16 and the target 20. Of course, there are many possible variations in the ultrasonic portion of the equipment which can be used and also in the signal processing portion and in the decade counter portion, but essentially every system will require a plurality of lights 46 which will operate in the general manner as described above.

Since the circuit elements such as the burst oscillator, transducer, flip-flop, clock oscillator, AND gates, decade counters, L.E.D. etc. are all items which are well known in the art and available on the market no further description is believed to be necessary.

While the invention has been described with a certain degree of particularity it is manifest that many changes may be made in the details of construction and the arrangement of components. It is understood that the invention is not to be limited to the specific embodiment set forth herein by way of exemplifying the invention, but the invention is to be limited only by the scope of the attached claim or claims, including the full range of equivalency to which each element or step thereof is entitled.

What is claimed:

1. In a sonar transmitting and reflection-receiving system having a first source of first time pulses having a first repetition rate of period T, means responsive to the pulses of said first source for generating ultrasonic pulses in a water medium, means for receiving reflections of said ultrasonic pulses and responsive thereto, for generating second timed pulses corresponding to the times of reception of said ultrasonic reflection pulses, the improvement in display means, comprising:

a. a third source of third timed pulses of period $t$, where $t$ is small compared to T;

b. counter means comprising units and tens counters, each having 10 terminals, said tens counter responsive to said units counter, said units counter responsive to said first and third pulses for presenting electrical pulses sequentially on a plurality of N gate means in synchronism with said third pulses;

c. means for starting said counter means in synchronism with said first pulses and for stopping said counter means on the count of N;

d. said plurality of gate means having one input of each gate connected to one of said terminals in said units counter, a second input of each gate connected to one of said terminals in said tens counter, and a third input of each gate connected to said source of said second pulses; and e. the output of each gate means connected to one of a plurality of voltage sensitive light source.

2. The sonar display system as in claim 1 in which said selected time interval $t$ corresponds to the time of travel of said ultrasonic pulses over a selected distance in water.

3. The sonar display system as in claim 2 in which said selected distance is two feet and said interval t is 0.0004 seconds.

4. The sonar display system as in claim 1 in which said light sources comprise light emitting diodes.

5. The sonar display system as in claim 1 in which said light sources comprise neon lamps.

6. The sonar display system as in claim 1 in which said means for starting said counter comprises flip-flop means which is set by said first pulses and reset by said counter means on the count of N, and input AND gate means, one input connected to said third source, the second input connected to said flip-flop, and the output connected to said counter.

7. The sonar display system as in claim 1 in which said number N is in the range of 100.

8. The sonar display system as in claim 1 in which said period T equals approximately 0.04 seconds and said period $t$ equals approximately 0.0004 seconds.

* * * * *